(12) United States Patent
Lampton

(10) Patent No.: US 10,302,201 B2
(45) Date of Patent: May 28, 2019

(54) ENHANCEMENT OF VALVE FLOW AND PRESSURE CHARACTERISTICS IN VALVES AND HYDRAULIC SYSTEMS

(71) Applicant: Sun Hydraulics, LLC, Sarasota, FL (US)

(72) Inventor: Chad Lampton, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 78 days.

(21) Appl. No.: 15/691,487

(22) Filed: Aug. 30, 2017

(65) Prior Publication Data

US 2019/0063615 A1 Feb. 28, 2019

(51) Int. Cl.
*F16K 1/38* (2006.01)
*F16K 15/02* (2006.01)

(52) U.S. Cl.
CPC .............. *F16K 1/38* (2013.01); *F16K 15/026* (2013.01); *Y10T 137/7876* (2015.04)

(58) Field of Classification Search
CPC .......................... F16K 15/026; Y10T 137/7876
USPC ........................................................ 251/333
See application file for complete search history.

(56) References Cited

U.S. PATENT DOCUMENTS

| | | | | |
|---|---|---|---|---|
| 2,287,936 A | * | 6/1942 | Hose ....................... | G05D 16/10 137/489.5 |
| 3,101,092 A | * | 8/1963 | Seaborne ................ | A01J 5/048 137/270 |
| 3,323,549 A | | 6/1967 | Carrington | |
| 3,587,634 A | * | 6/1971 | Krause ................... | F16K 17/168 137/522 |
| 3,776,510 A | * | 12/1973 | Beck ....................... | F16K 31/44 137/625.27 |
| 4,444,220 A | * | 4/1984 | Seger ...................... | F16K 25/04 137/312 |
| 4,646,786 A | * | 3/1987 | Herder .................... | F16K 11/07 137/625.3 |
| 5,295,663 A | * | 3/1994 | Machat ................... | F16K 17/10 137/489 |
| 6,776,191 B2 | | 8/2004 | Nakamura et al. | |
| 6,807,985 B2 | | 10/2004 | Stares et al. | |
| 7,104,283 B2 | | 9/2006 | Ino et al. | |
| 9,404,599 B2 | | 8/2016 | Peterson et al. | |

FOREIGN PATENT DOCUMENTS

JP       H0356782 A     3/1991

* cited by examiner

*Primary Examiner* — Eric Keasel
*Assistant Examiner* — Kevin R Barss

(57) ABSTRACT

An example valve includes: (i) a housing defining a first longitudinal cavity therein; (ii) a sleeve disposed in the first longitudinal cavity coaxial with the housing, where the sleeve defines (a) a first port at an end of the sleeve, (b) a second port disposed on an exterior peripheral surface of the sleeve, and (c) a second longitudinal cavity therein, where an interior peripheral surface of the sleeve defines a first portion that is tapered at a particular angle and a second portion adjacent to the first portion, where the second portion has two edges forming a corner that defines a seat; and (iii) a poppet mounted within the second longitudinal cavity and configured to move axially therein.

17 Claims, 4 Drawing Sheets

US 10,302,201 B2

ENHANCEMENT OF VALVE FLOW AND PRESSURE CHARACTERISTICS IN VALVES AND HYDRAULIC SYSTEMS

BACKGROUND

A hydraulic valve directs the flow of a liquid medium, usually oil, through a hydraulic system. The direction of the oil flow is determined by the position of a spool or a poppet. The size of the valve may be determined by the maximum flow of the hydraulic system through the valve and the maximum system pressure.

An example valve may have a movable element inside a housing or sleeve. For instance, the valve may include a poppet that is movable by an actuation mechanism (e.g., electric, hydraulic, pneumatic, or manual). The poppet may be seated on a valve seat formed inside the housing. Once the valve is actuated, the poppet moves off the seat to allow flow around the poppet from a first port to a second port.

As fluid flows around the poppet, a pressure drop occurs between the first port and the second port. The larger the pressure drop, the less efficient the valve may be considered. Further, fluid flow around the poppet may cause flow forces to oppose the actuation force applied to the poppet, and as a consequence, the valve might not operate as expected.

Therefore, it may be desirable to have a valve that reduces pressure drop thereacross and also reduces the flow forces.

SUMMARY

The present disclosure describes implementations that relate to enhancement of valve flow and pressure characteristics. In a first example implementation, the present disclosure describes a valve. The valve includes: (i) a housing defining a first longitudinal cavity therein; (ii) a sleeve disposed in the first longitudinal cavity coaxial with the housing, where the sleeve defines (a) a first port at an end of the sleeve, (b) a second port disposed on an exterior peripheral surface of the sleeve, and (c) a second longitudinal cavity therein, where an interior peripheral surface of the sleeve defines a first portion that is tapered at a particular angle and a second portion adjacent to the first portion, where the second portion has two edges forming a corner that defines a seat; and (iii) a poppet mounted within the second longitudinal cavity and configured to move axially therein. When the valve is unactuated, the poppet is seated on the seat of the sleeve to preclude flow through the valve from the first port to the second port, and when the valve is actuated, the poppet moves off the seat to allow fluid to flow from the first port, through a flow area formed between: (a) an exterior peripheral surface of the poppet, and (b) the first and second portions of the interior peripheral surface of the sleeve, to the second port.

In a second example implementation, the present disclosure describes a valve. The valve includes: (i) a valve body defining (a) a first port, (b) a second port, and (c) a longitudinal cavity therein, where an interior peripheral surface of the valve body defines a first portion that is tapered at a particular angle and a second portion adjacent to the first portion, where the second portion has two edges forming a substantially 90° corner that defines a seat; and (ii) a movable element mounted within the longitudinal cavity and configured to move axially therein. When the valve is unactuated, the movable element is seated on the seat of the valve body to preclude flow through the valve from the first port to the second port, and when the valve is actuated, the movable element moves off the seat to allow fluid to flow from the first port, through a flow area formed between: (a) an exterior peripheral surface of the movable element, and (b) the first and second portions of the interior peripheral surface of the valve body, to the second port.

In a third example implementation, the present disclosure describes a hydraulic system. The hydraulic system includes: (i) a source of pressurized fluid; (ii) a reservoir; and (iii) a valve fluidly coupled to the source of pressurized fluid and the reservoir. The valve includes: (i) a sleeve defining (a) a first port at an end of the sleeve, where the first port is fluid coupled to the source of pressurized fluid, (b) a second port disposed on an exterior peripheral surface of the sleeve, where the second port is fluidly coupled to the reservoir, and (c) a longitudinal cavity therein, where an interior peripheral surface of the sleeve defines a first portion that is tapered at a particular angle and a second portion adjacent to the first portion, where the second portion has two edges forming a substantially 90° corner that defines a seat; and (ii) a poppet mounted within the longitudinal cavity and configured to move axially therein. When the valve is unactuated, the poppet is seated on the seat of the sleeve to preclude flow through the valve from the source of pressurized fluid to the reservoir, and when the valve is actuated, the poppet moves off the seat to allow pressurized fluid to flow from the first port, through a flow area formed between: (a) an exterior peripheral surface of the poppet, and (b) the first and second portions of the interior peripheral surface of the sleeve, to the second port.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

In examples, a normally-closed valve may have a poppet that is seated on a seat formed as a protrusion from an interior peripheral surface of a cage, sleeve, valve body, or housing. The poppet is unseated and moves within the valve body when the valve is actuated to form a gap between an exterior peripheral surface of the poppet and the seat, thereby allowing fluid to flow from an inlet through the gap to an outlet.

The design of the interface of the poppet with the seat determines the characteristics of the flow forces that act to close the valve (i.e., re-seat the poppet) despite actuating the valve, and the pressure drop from the inlet to the outlet. Flow forces may cause the valve to not perform as expected and large pressure drops across the valve cause power loss and a reduced efficiency of the valve. Thus, it may be desirable to design the geometry of the poppet and the seat to reduce both the pressure drop across the valve and the flow forces acting on the poppet.

Figure 1:
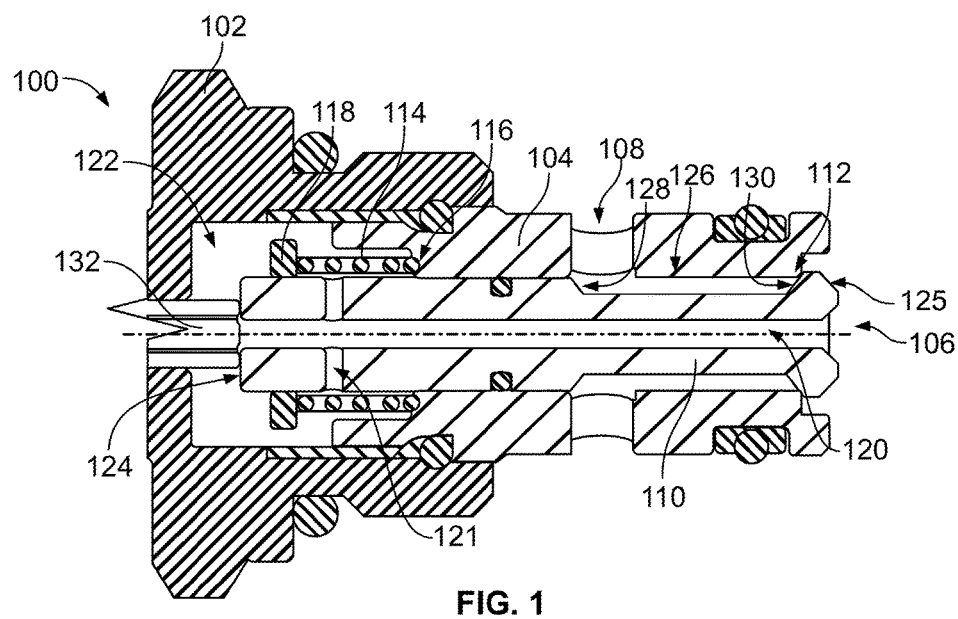
FIG. 1 illustrates a cross section of a portion of an example valve in a closed position, in accordance with an example implementation.

FIG. 1 illustrates a cross section of a portion of an example valve 100 in a closed position, in accordance with an example implementation. The valve 100 may include a housing 102 that defines a longitudinal cylindrical cavity therein. The longitudinal cylindrical cavity of the housing 102 is configured to receive a cage or sleeve 104 coaxial with the housing 102. The sleeve 104 defines a first opening or port 106 and a second opening port 108. The first port 106 is defined at an end or a nose of the sleeve 104, whereas the second port 108 may be defined as holes disposed in a radial array about an exterior peripheral surface of the sleeve 104.

In examples, the first port 106 may be fluidly coupled to a source of pressurized fluid (e.g., a pump, an accumulator, or any other hydraulic component of a hydraulic system). The valve 100 is configured to control flow of fluid from the source of pressurized fluid to a tank or another hydraulic component (e.g., another valve) fluidly coupled to the second port 108. For instance, the valve 100 may represent a relief valve that relieves or limits the pressure at an outlet of a pump in a hydraulic system by diverting high pressure fluid to a reservoir. The valve 100 might represent other types of valves as well.

In other examples, the second port 108 may be fluidly coupled to the source of pressurized fluid, and the valve 100 controls flow of fluid from the source of pressurized fluid to a tank or another hydraulic component fluidly coupled to the first port 106. This way, the valve 100 may be referred to as bi-directional as the valve 100 is configured to allow and control fluid flow from the first port 106 to the second port 108 and from the second port 108 to the first port 106.

The sleeve 104 defines a respective longitudinal cylindrical cavity therein. A poppet 110 is disposed in the cavity defined within the sleeve 104, and the poppet 110 is coaxial with the housing 102 and the sleeve 104. In the closed position shown in FIG. 1, the poppet 110 is seated on a seat 112 defined as a circumferential protrusion in an interior peripheral surface of the sleeve 104. The seat 112 may be conical in shape. The poppet 110 has a respective protrusion formed as a tapered circumferential, conical surface that contacts the seat 112 when the poppet 110 is seated (e.g., when the valve 100 is unactuated).

The valve 100 further includes a spring 114 disposed around an exterior peripheral surface of the poppet 110 between a shoulder 116 formed on the interior peripheral surface of the sleeve 104 and a washer 118 coupled to an exterior surface of the poppet 110. The spring 114 applies a force on the washer 118, and thus on the poppet 110, in a closing direction (e.g., to the left in FIG. 1).

Further, the poppet 110 includes a longitudinal internal channel 120 and radial channels 121 that communicate fluid received at the first port 106 to a chamber 122 defined within the housing 102. In this manner, if the first port 106 is fluidly coupled to the source of pressurized fluid, the pressurized fluid at the first port 106 is communicated to a back end 124 of the poppet 110. The pressurized fluid in the chamber 122 acts on a surface area of the back end 124 of the poppet 110 that is substantially identical or equal to a respective surface area of a front end 125 of the poppet 110 on which the pressurized fluid at the first port 106 acts. With this configuration, the poppet 110 is pressure-balanced, and the spring 114 applying a force in the closing direction on the poppet 110 maintains the poppet 110 seated at the seat 112.

If the second port 108 is fluidly coupled to the source of pressurized fluid, the pressurized fluid received at the second port 108 is communicated through the holes in the sleeve 104 to an annular chamber 126 formed between the exterior peripheral surface of the poppet 110 and the interior peripheral surface of the sleeve 104. The pressurized fluid in the chamber 126 acts on surface areas of a first annular surface 128 and a second annular surface 130 of the poppet 110, where the surface areas are substantially identical or equal to each other. This way, the poppet 110 is pressure-balanced, and the spring 114 applying a force in the closing direction on the poppet 110 maintains the poppet 110 seated at the seat 112. Therefore, the valve 100 may be referred to as a normally-closed valve that is double-blocking because fluid is blocked from flowing across the valve from the first port 106 to the second port 108 and from the second port 108 to the first port 106 when the valve 100 is unactuated.

The poppet 110 is configured to move axially in the cavity defined within the sleeve 104 when the valve 100 is actuated by any type of actuation mechanisms. For example, the valve 100 may include a push pin 132 disposed in the longitudinal cylindrical cavity of the housing 102 coaxial with the housing 102, the sleeve 104, and the poppet 110. The push pin 132 is disposed longitudinally adjacent to the poppet 110.

When the valve 100 is actuated, a force is applied to the push pin 132 to move the push pin 132 axially toward the poppet 110. For instance, the valve 100 may include a solenoid (not shown) that has an armature and a pole piece and an air gap (e.g., empty space) therebetween. The push pin 132 may be coupled to the armature. When an electric signal is sent to the solenoid, the armature moves toward the pole piece, thus causing the push pin 132 to move axially toward the poppet 110. The push pin 132 thus contacts the poppet 110 and causes the poppet 110 to move axially to be unseated, and the valve 100 is opened.

Other actuation mechanisms could include manual actuation where an operator pushes a lever or handle coupled to the push pin 132 to move it. In other examples, the valve 100 may be hydraulically or pneumatically actuated, where a source of pressurized fluid is communicated to the valve 100 to apply pressure to the push pin 132 and move it axially to unseat the poppet 110. Other example actuation mechanisms are possible.

Assuming that the first port 106 is fluidly coupled to the source of pressurized fluid, when the valve 100 is actuated and the poppet 110 is unseated, a gap (e.g., flow area that allows fluid flow therethrough) is formed between the exterior surface of the poppet 110 and the seat 112, thus allowing fluid to flow from the first port 106 around the poppet 110 through the gap and the chamber 126 to the second port 108. The gap operates as a restriction orifice that causes a pressure drop in the pressure level of the fluid flowing through the valve 100. Such pressure drop is related to fluid velocity, specific gravity, viscosity, and the size and shape of the gap or orifice formed between the poppet 110 and the seat 112. Further, the pressure drop may increase as turbulence of the fluid flowing through the gap increases, and may also increase at higher the flow rates. Higher pressure drops render the valve 100 inefficient as the pressure drop multiplied by the flow rate is a power loss that is dissipated as heat from the valve 100.

Further, as the valve 100 is actuated and the poppet 110 is unseated, Bernoulli flow forces result from accelerating fluid mass through the gap between the poppet 110 and seat 112. The flow forces may have an axial or longitudinal component that acts on the poppet 110 in a closing direction (e.g., to the left in FIG. 1) opposing the opening force applied to the poppet 110 to unseat it (e.g., the opening force may be the force of a solenoid minus a force of the spring 114). In some cases, the flow forces are sufficiently high that the opening force of the actuation mechanism might not be sufficient to open the valve 100. One of the factors that affect both the pressure drop across the valve 100 as well as the flow forces is the geometry of the poppet 110 and the seat 112.

Figure 2:
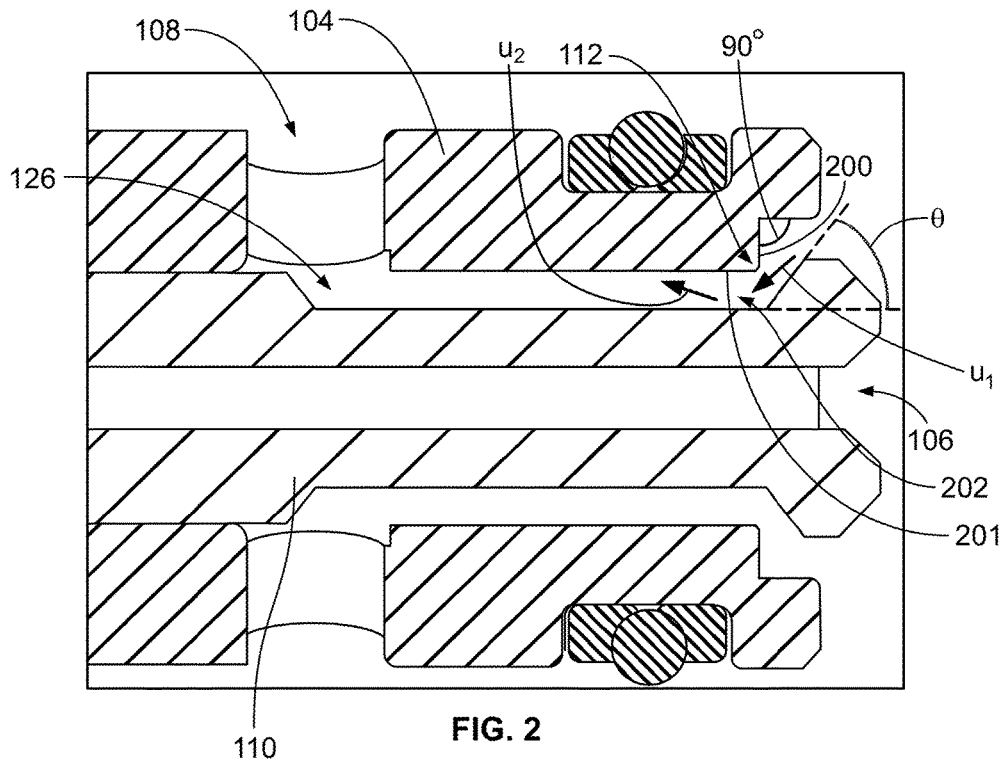
FIG. 2 illustrates a zoomed-in view of the valve of FIG. 1 showing the valve in an open state with a poppet unseated, in accordance with an example implementation.

FIG. 2 illustrates a zoomed-in view of the valve 100 showing the valve 100 in an open state with the poppet 110 unseated, in accordance with an example implementation. In the configuration shown in FIG. 2, the seat 112 is defined as a sharp corner formed by edges 200 and 201 with the interior peripheral surface of the sleeve 104 making two 90° angles to form the seat 112. With this configuration, fluid received through the first port 106 flows through an inlet portion of the sleeve 104, then impacts the edge 200 of the sleeve 104. The fluid then turns 90° sharply downward and then flows through an orifice or gap 202 formed between the poppet 110 and the seat 112, then to the chamber 126 and flows out through the second port 108.

Thus, the fluid makes several sharp turns and flows about sharp edges, thereby causing fluid turbulence to increase. Further, the fluid is accelerated as it passes through the gap 202, reaching the maximum velocity a short distance downstream of the gap 202 at the *Vena Contracta*. The increase in velocity comes at the expense of fluid pressure resulting in low pressures in the *Vena Contracta*. Downstream of the *Vena Contracta* in the recovery zone, the fluid decelerates converting excess kinetic energy into pressure as the fluid slows. When the fluid has decelerated and returned to the normal flow pattern, the final downstream pressure is reached. However, the sharp edge configuration of the seat 112 causes the pressure drop between the inlet pressure at the first port 106 and the pressure at the point where the fluid velocity is maximum to increase. Further, the pressure level at the first port 106 may increase, thus causing the pressure drop between the inlet pressure at the first port 106 and the outlet pressure at the second port 108 to increase. As such, the sharp edge configuration of the seat 112 in of FIG. 2 increases the pressure drop and power loss through the valve 100.

However, the configuration shown in FIG. 2 may decrease the flow forces. During operation of the valve 100, flow forces acting on the poppet 110 in the closing direction are caused by the momentum of the fluid flowing through the valve 100. As mentioned above, pressure of the fluid varies as it flows through the gap 202. Particularly, an area of lower pressure develops in the gap 202 or at the *Vena Contracta* compared to the region before and after the *Vena Contracta*. Therefore, a force develops as a result of the pressure distribution (i.e., variation) about a circumference or profile of the poppet 110. This force acts in the closing direction of the poppet 110.

The configuration in FIG. 2 may reduce the change in momentum of fluid as it flows through the gap 202. As described above, the fluid is accelerated through the gap 202 and is then decelerated downstream from the gap 202. For instance, the fluid may have a particular entry velocity, e.g., "$u_1$," prior to flowing through the gap 202, then the velocity increases as fluid accelerates through the gap 202, and then the fluid decelerates to another velocity, e.g., "$u_2$." The flow forces resulting from the flow may be determined based on the density of the fluid, the flow rate of the fluid across the gap 202, the change in fluid momentum associated with the difference between "$u_2$", and "$u_1$", and an angle θ shown in FIG. 2. Particularly, the angle θ is a taper angle of a portion of the exterior peripheral surface of the poppet 110 that interfaces with the seat 112. As an example for illustration, the angle θ could be 22°, 22.5°, 45°, or other angles within a threshold angle (e.g., +2°) therefrom. Other angles are also possible.

In examples, the flow forces that tend to re-seat the poppet 110 and oppose the opening force increases as the velocity "$u_2$" increases, and vice versa, because an increase in the velocity "$u_2$" may indicate an increase in the change in fluid momentum. Thus, a geometric configuration that reduces the velocity "$u_2$" may reduce the flow forces.

The configuration shown in FIG. 2 may achieve a reduced velocity "$u_2$." As a result of the sharp-edge configuration of the seat 112, the flow area through which the fluid flows increases rapidly upon passing through the gap 202. The rapid increase in the flow area causes a corresponding rapid fluid deceleration and a reduced velocity "$u_2$." If the difference between "$u_2$" And "$u_1$" is reduced, the change in fluid momentum is decreased, and therefore the sharp-edge configuration of the seat 112 causes the flow forces to be reduced.

Further, as mentioned above, flow forces develop as a result of the pressure distribution about a circumference or profile of the poppet 110. If a smaller area of the profile of the nose of the poppet 110 is subjected to the variation in pressure, then the flow forces may be decreased. The configuration of FIG. 2 may cause a smaller area of the profile of the nose of the poppet 110 to be smeared with a pressure variation or distribution, and therefore, the flow forces may be decreased.

As such, the sharp-edge seat configuration shown in FIG. 2 may be desirable to reduce the flow forces; however, with this configuration, the pressure drop is increased. In an example, to reduce the pressure drop across the valve 100, rather than using a sharp-edged seat such as the seat 112 shown in FIGS. 1 and 2, the interior peripheral surface of the sleeve 104 may be tapered to gradually change direction of the fluid flow, and gradually change the pressure level of the fluid so as to reduce the extent of turbulence and pressure drop.

Figure 3A:
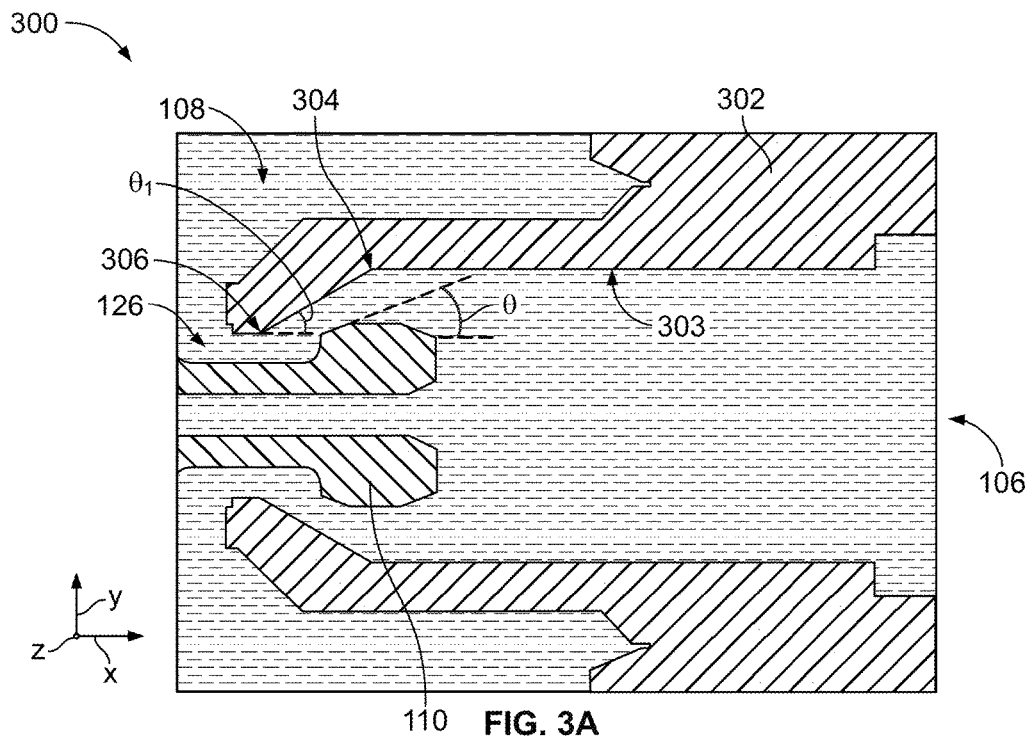
FIG. 3A illustrates a portion of a cross sectional view of a valve in an opened state, with a sleeve having a tapered interior peripheral surface, in accordance with another example implementation.

FIG. 3A illustrates a portion of a cross sectional view of a valve 300 in an open state, with a sleeve 302 having a tapered interior peripheral surface, in accordance with an example implementation. The valve 300 may have the same poppet 110 as the valve 100, but the sleeve 302 is different from the sleeve 104 shown in FIGS. 1 and 2.

As shown in FIG. 3A, when the valve 300 is actuated and the poppet 110 moves axially (to the right in FIG. 3A) the fluid flowing through the first port 106 enters a flow area formed between the exterior peripheral surface of the poppet 110 and an interior peripheral surface of the sleeve 302. As shown, the interior peripheral surface of the sleeve 302 may be untapered (i.e., appears flat in the cross sectional view) at a nose portion 303 of the sleeve 302 and then tapers at a lead-in angle $\theta_1$ starting at a point 304 until a point 306, which forms a seat that the poppet 110 is secured against when the valve 300 is unactuated. As an example for illustration, the lead-in angle $\theta_1$ could be 30° or within a threshold angle (e.g., ±3°) therefrom. However, other angles are also possible. The portion between the point 304 and the point 306 thus forms a conical circumferential surface.

As mentioned above with respect to FIG. 2, a portion of the exterior peripheral surface of the nose of the poppet 110 is tapered at the angle θ. Thus, the poppet 110 and the sleeve 302 form an annular, conical channel that guides the fluid and gradually changes its direction as it flows through the gap between the poppet 110 and the sleeve 302. The angle θ could be different from the angle $\theta_1$, and thus the flow area through the conical channel between the poppet 110 and the sleeve 302 may change. For instance, if θ is less than $\theta_1$ (e.g., θ=22° and $\theta_1$=30°), then the conical channel is a converging conical channel with the flow area decreasing from a beginning of the channel to an end of the channel at the point 306.

In other words, a cross sectional area of the conical channel formed between the poppet 110 and the sleeve 302 is variable, or varies longitudinally along a length of the sleeve 302. However, the change in the flow area is gradual, thus reducing the extent of turbulence in the fluid. After the point 306, the interior peripheral surface of the sleeve 302 does not taper, and thus the diameter of the interior peripheral surface of the sleeve 302 may remain substantially constant.

With this configuration, the flow area through which the fluid flows gradually changes as opposed to abruptly changing as described with respect to the configuration of FIGS. 1 and 2. Rather than the sharp 90° turns of the configuration in FIGS. 1 and 2, in FIG. 3A the fluid is guided in a channel formed between the poppet 110 and the interior peripheral surface area of the sleeve 302 with gradual changes in flow direction and flow areas. This configuration of FIG. 3A may reduce the extent of turbulence in the fluid, and thus the pressure drop and power loss may be reduced compared to the configuration shown in FIGS. 1 and 2.

Figure 3B:
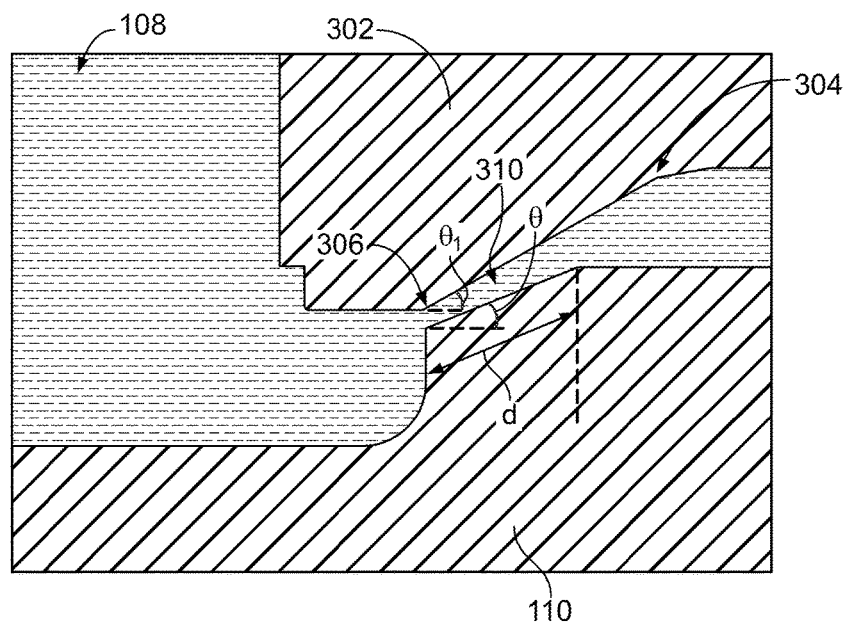
FIG. 3B illustrates a zoomed-in cross sectional view of the valve of FIG. 3A with a poppet unseated, in accordance with another example implementation.

However, with the configuration of FIG. 3A where the interior peripheral surface of the sleeve 302 is tapered all the way to the point 306 which forms the seat, flow forces may increase. FIG. 3B illustrates a zoomed-in cross sectional view of the valve 300 with the poppet 110 unseated, in accordance with an example implementation. FIG. 3B shows the valve 300 at an initial opening position where the poppet 110 has just been unseated to form a gap 310 with the tapered interior peripheral surface of the sleeve 302.

As shown in FIG. 3B, the flow area formed between the poppet 110 and the sleeve 302 gradually decreases as fluid flows through the gap 310, and thus the velocity of the fluid increases gradually relative to the velocity of the fluid at the point 304. This increase in velocity may cause a change in the momentum of the fluid interfacing with the poppet 110, and thus large flow forces acting on the poppet 110 may develop.

Further, as fluid flows through the gap 310, the pressure level decreases as the velocity increases. Compared to the configuration of FIGS. 1 and 2, a larger region (labelled as "d" in FIG. 3B) of the poppet 110 is being smeared with a pressure variation or distribution. As a result, the flow forces acting on the poppet 110 may be larger compared to the configuration in FIGS. 1 and 2.

As such, the configuration shown in FIGS. 3A-3B may reduce the pressure drop compared to the configuration of FIGS. 1 and 2; however, the flow forces may be increased compared to the configuration of FIGS. 1 and 2. In an example, to reduce both the pressure drop and the flow forces, rather than the tapering extending from the point 304 all the way to the point 306, the interior peripheral surface between the points 304 and 306 could be divided into at least two regions. A first region may be tapered to gradually guide the fluid and gradually change the pressure level of the fluid so as to reduce the extent of turbulence and pressure drop, and a second region that forms a sharp-edge seat to reduce the flow forces, as described next.

Figure 4A:
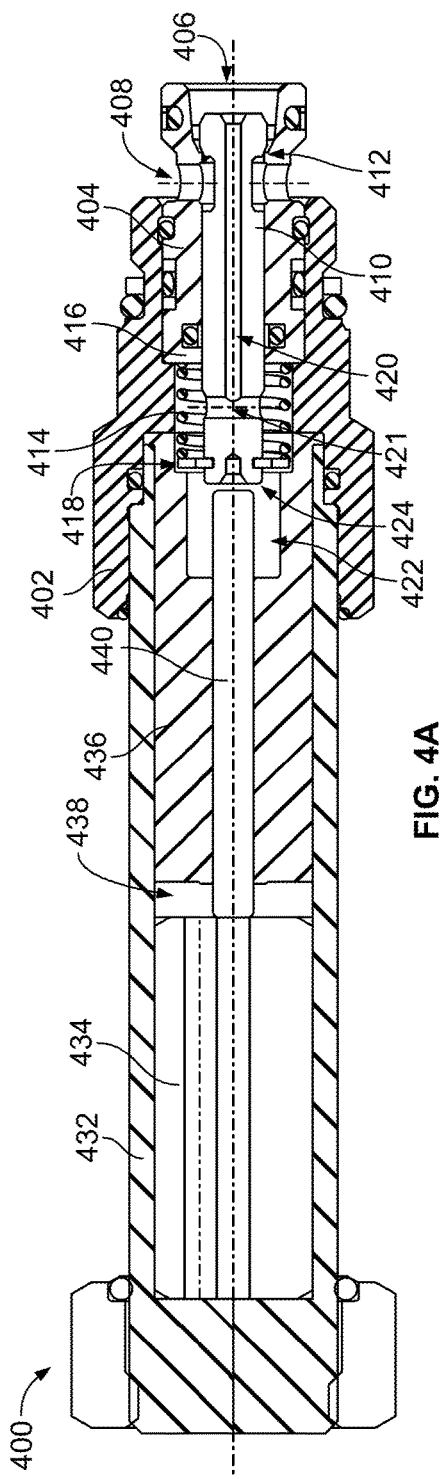
FIG. 4A illustrates a valve, in accordance with an example implementation.

FIG. 4A describes a valve 400, in accordance with an example implementation. The Valve 400 includes a housing 402 that defines a longitudinal cylindrical cavity therein. The longitudinal cylindrical cavity of the housing 402 is configured to receive at a proximal or first end thereof a cage or sleeve 404 coaxial with the housing 402. The sleeve 404 may also be referred to as a valve body. The sleeve 404 defines a first port 406 and a second port 408. The first port 406 is defined at a nose of the sleeve 404, whereas the second port 408 may be defined as holes disposed in a radial array about an exterior surface of the sleeve 404. The valve 400 is configured to control flow of fluid between the first port 406 and the second port 408. As such, similar to the valve 100, the valve 400 may be referred to as a bi-directional valve that is configured to control fluid flow from the first port 106 to the second port 108 and from the second port 108 to the first port 106.

The sleeve 404 defines a respective longitudinal cylindrical cavity therein. A poppet 410 is disposed in the cavity defined within the sleeve 404, and the poppet 410 is coaxial with the housing 402 and the sleeve 404. The poppet 410 may be similar in construction to the poppet 110 described above.

In the closed position shown in FIG. 4A, the poppet 410 is seated on a seat 412 defined as a circumferential protrusion in an interior peripheral surface of the sleeve 404. The poppet 410 has a respective protrusion formed as a tapered circumferential surface that contacts the seat 412 when the poppet 410 is seated.

The valve 400 further includes a spring 414 disposed around an exterior peripheral surface of the poppet 410 between a shoulder 416 formed by the interior peripheral surface of the sleeve 404 and a retaining ring 418 (e.g., E-type retaining ring) coupled to an exterior surface of the poppet 410. The spring 414 applies a force on the retaining ring 418, and thus on the poppet 410, in a closing direction (e.g., to the left in FIG. 4A).

Further, the poppet 410 includes a longitudinal internal channel 420 and radial channels 421 that communicate fluid received at the first port 406 to a chamber 422 defined at a back end 424 of the poppet 410. In this manner, if the first port 106 is fluidly coupled to the source of pressurized fluid, the pressurized fluid at the first port 106 is communicated to a back end 124 of the poppet 110.

With this configuration, similar to the configuration of the valve 100 in FIG. 1, the poppet 410 is pressure-balanced, and the spring 414 applying a force in the closing direction on the poppet 410 maintains the poppet 410 seated at the seat 412. Therefore, the valve 400 may be referred to as a normally-closed valve that is double-blocking because fluid is blocked from flowing across the valve from the first port 406 to the second port 408 and from the second port 408 to the first port 406 when the valve 400 is unactuated.

The poppet 410 is configured to move axially in the cavity defined within the sleeve 404 when the valve 400 is actuated by any type of actuation mechanisms. For example, the valve 400 may include a solenoid tube 432 disposed within and received at a distal or second end of the housing 402, such that the solenoid tube 432 is coaxial with the housing

402. A solenoid coil (not shown) may be disposed about an exterior surface of the solenoid tube 432.

The solenoid tube 432 is configured to house a plunger or armature 434 and a pole piece 436. The pole piece 436 is separated from the armature 434 by an airgap 438. Further, the armature 434 may be in contact with a push pin 440 disposed in the longitudinal cylindrical cavity of the housing 402 partially within the pole piece 436, partially disposed in the airgap 438, and partially disposed in the chamber 422 longitudinally adjacent the poppet 410. The push pin 440 may be coaxial with the housing 402, the sleeve 404, the poppet 410, the solenoid tube 432, the armature 434, and the pole piece 436.

When an electric current is provided through the windings of the solenoid coil, a magnetic field is generated. The pole piece 436 is fixedly disposed (i.e., stationary or immovable) within the solenoid tube 432 and is composed of material of high magnetic permeability. The pole piece 436 accordingly directs the magnetic field through the airgap 438 toward the armature 434, which is movable and is attracted toward the pole piece 436. In other words, when an electric current is applied to the solenoid coil, the generated magnetic field forms a north and south pole in the pole piece 436 and the armature 434, and therefore the pole piece 436 and the armature 434 are attracted to each other. Because the pole piece 436 is fixed and the armature 434 is movable, the armature 434 traverses the airgap 438 toward the pole piece 436.

As the armature 434 moves toward the pole piece 436, it causes the push pin 440 to move axially toward the poppet 410. The push pin 440 then contacts the poppet 410 and causes the poppet 410 to move axially and be unseated off the seat 412. Although the valve 400 is described herein with an electric solenoid actuation mechanism, other actuation mechanisms could be used. For instance, the valve 400 could be manually actuated where an operator pushes a lever or handle coupled to the push pin 440 or the poppet 410 to move it. In other examples, the valve 400 may be hydraulically or pneumatically actuated, where a source of pressurized fluid is communicated to the valve 400 to apply pressure to the push pin 440 and move it toward the poppet 410, or apply pressure directly to the poppet 410 to move it. Other example actuation mechanisms are possible.

Similar to the valve 100, assuming that the first port 406 is fluidly coupled to the source of pressurized fluid, when the valve 400 is actuated and the poppet 410 is unseated, a gap is formed between the exterior surface of the poppet 410 and the seat 412, thus allowing fluid to flow from the first port 406 around the poppet 410 through the gap to the second port 408. The gap operates as a restriction orifice that causes a pressure drop in the pressure level of the fluid flowing through the valve 400. Further, as the valve 400 is actuated and the poppet 410 is unseated, Bernoulli flow forces result from accelerating fluid mass through the gap between the poppet 410 and seat 412. The sleeve 404 is designed with a geometry that reduces both pressure drop and flow forces, and thus has advantages of both the valve 100 and the valve 300.

Figure 4B:
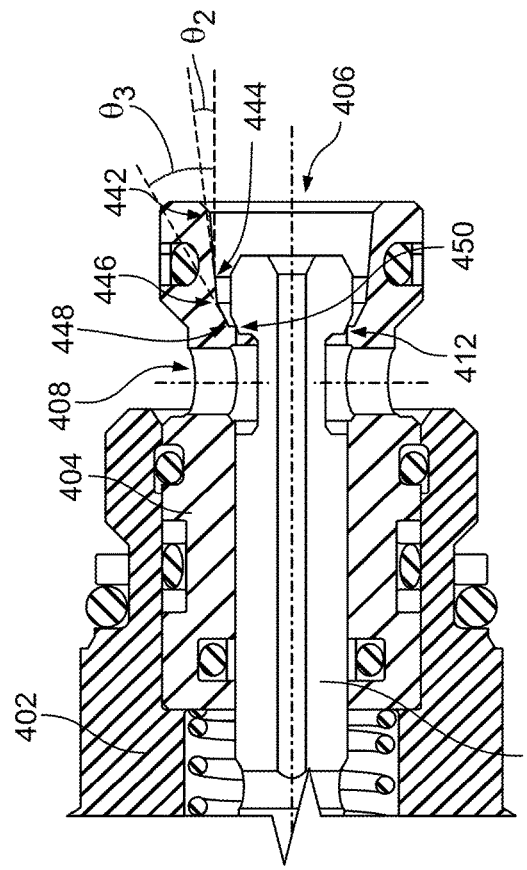
FIG. 4B illustrates a zoomed-in view of a portion of the valve shown in FIG. 4A, in accordance with an example implementation.

FIG. 4B illustrates a zoomed-in view of a portion of the valve 400, in accordance with an example implementation. As shown in FIG. 4B, the interior peripheral surface of the sleeve 404 defines a first portion that is tapered at a lead-in angle $\theta_2$ starting at a point 442 until a point 444. This first lead-in portion may streamline the flow of fluid entering through the first port 406. As an example for illustration, the lead-in angle $\theta_2$ could be about 7° or within a threshold angle (e.g., +1°) therefrom. Other angles are possible. Also, in some examples, the first portion may be untapered (e.g., $\theta_2$ could be about 0°).

The interior peripheral surface then defines a second portion that is untapered (i.e., appears flat in the cross sectional view) between the point 444 and a point 446. The interior peripheral surface of the sleeve 404 then defines a third portion that is tapered at a lead-in angle $\theta_3$ starting at the point 446 until a point 448. This second lead-in portion may further streamline the flow of fluid entering through the first port 406. As an example for illustration, the lead-in angle $\theta_3$ could be similar to the angle $\theta_1$ of the valve 300. As such the lead-in angle $\theta_3$ could be about 30° or within a threshold angle (e.g., +3°) therefrom. Other angles are possible.

However, in contrast to the configuration of the valve 300, the point 448 does not form or define the seat 412 for the poppet 410. The tapered lead in portion between the point 446 and 448 extends for a predetermined length and is then followed by a sharp turn between the point 448 and a point 450 to form the seat 412.

Figure 4C:
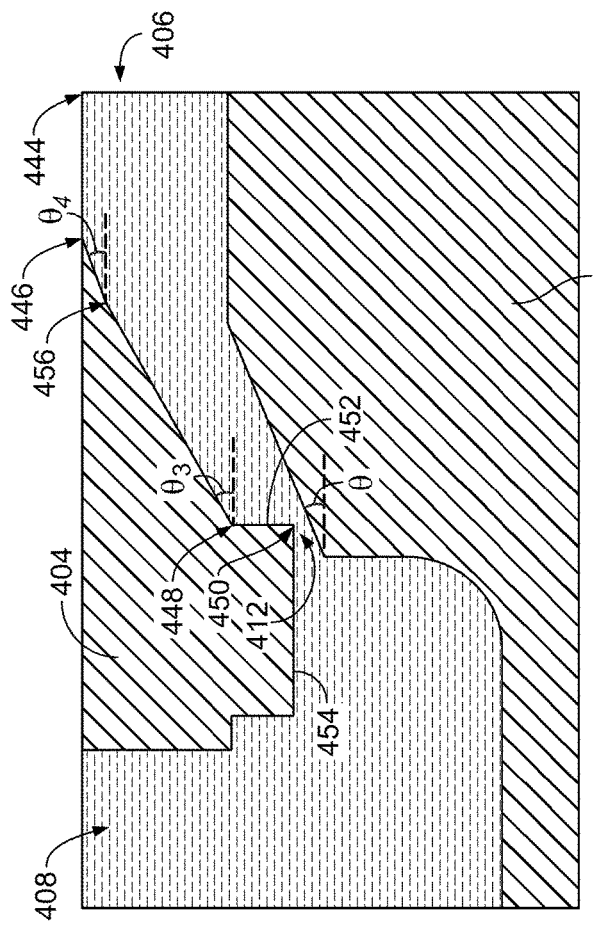
FIG. 4C illustrates a zoomed-in view of a portion of the valve of FIG. 4A with a poppet unseated, in accordance with an example implementation.

FIG. 4C illustrates a zoomed-in view of a portion of the valve 400 with the poppet 410 unseated, in accordance with an example implementation. As depicted in FIG. 4C, the point 450 is substantially vertically aligned with the point 448 and a vertical edge 452 is thus formed therebetween. The interior peripheral surface of the sleeve 404 then forms a horizontal edge 454, and the point 450 thus forms a sharp corner defined between the edges 452 and 454. The corner or the point 450 defines the seat 412 that the poppet 410 is secured against when the valve 400 is in a closed, unactuated state. The seat 412 is thus formed as sharp substantially 90° corner at the joinder of the edge 452 with the edge 454. The term "substantially" is used herein that the angle between the edges 452 and 454 is less than a threshold angle (e.g., ±5°) from 90°.

With this configuration, similar to the valve 300, the flow area between the sleeve 404 and the poppet 410 gradually changes as opposed to abruptly changing. Thus, similar to the configuration of FIG. 3, the fluid is guided in a conical channel formed between the poppet 410 and the interior peripheral surface area of the sleeve 404 between the points 446 and 448 with gradual changes in flow direction and flow area. Similar to the configuration shown in FIGS. 3A-3B, the angle $\theta$ of the exterior peripheral surface of the poppet 410 may be different from the angle $\theta_3$, and thus the flow area or the cross sectional area of the conical channel may vary gradually, longitudinally along a length of the conical channel. For instance, if $\theta$ is less than $\theta_1$ (e.g., $\theta=22°$ and $\theta_1=30°$), then the conical channel is a converging conical channel with the flow area decreasing gradually from a beginning of the channel (e.g., at the point 446) to an end of the channel at the point 448. As such, this configuration of FIGS. 4A-4C may reduce the extent of turbulence in the fluid, and thus the pressure drop and power loss may be reduced compared to the configuration shown in FIGS. 1 and 2.

In examples, the region of the interior peripheral surface of the sleeve 404 between the point 446 and 448 may be further divided into two portions with two lead-in angles. For instance, the interior peripheral surface of the sleeve 404 may taper an angle $\theta_4$ between the point 446 and a point 456, then tapers at the angle $\theta_3$, where the angle $\theta_3$ may be steeper than the angle $\theta_4$. This stepped or staggered tapering may further streamline the flow and reduce the pressure drop.

Further, the configuration of FIGS. 4A-4C contrasts with the configuration of FIG. 3A in that the tapered portion between the points 446 and 448 does not extend all the way to the corner or the point 450 forming the seat 412. Rather, the interior peripheral surface of the sleeve 404 forms the two straight edges 452 and 454 similar to the edges 200 and 201 of the configuration depicted in FIGS. 1 and 2. As described above with respect to FIGS. 1 and 2, having two straight edges forming the seat (e.g., the seat 112 or the seat 412) may reduce the flow forces by: (i) decreasing the change in fluid momentum as it flows through the gap between the poppet 410 and the sleeve 404, and (ii) causing a smaller area of the profile of the poppet 410 to be smeared with a pressure variation or distribution.

In examples, the length of the edge 452 might be made small so as to increase a length of the tapered portion between the points 446 and 448 and reduce the pressure drop. As an example for illustration, the edge 452 may be about 0.01 inch long and the benefits of reduced flow forces might still be attained. However, in examples, the length of the edge 452 may range from 0.001 inches to 0.03 inches. As such, the configuration of FIGS. 4A-4C may achieve a reduction in both the pressure drop across the valve 400 and the flow forces acting on the poppet 410.

Figure 5:
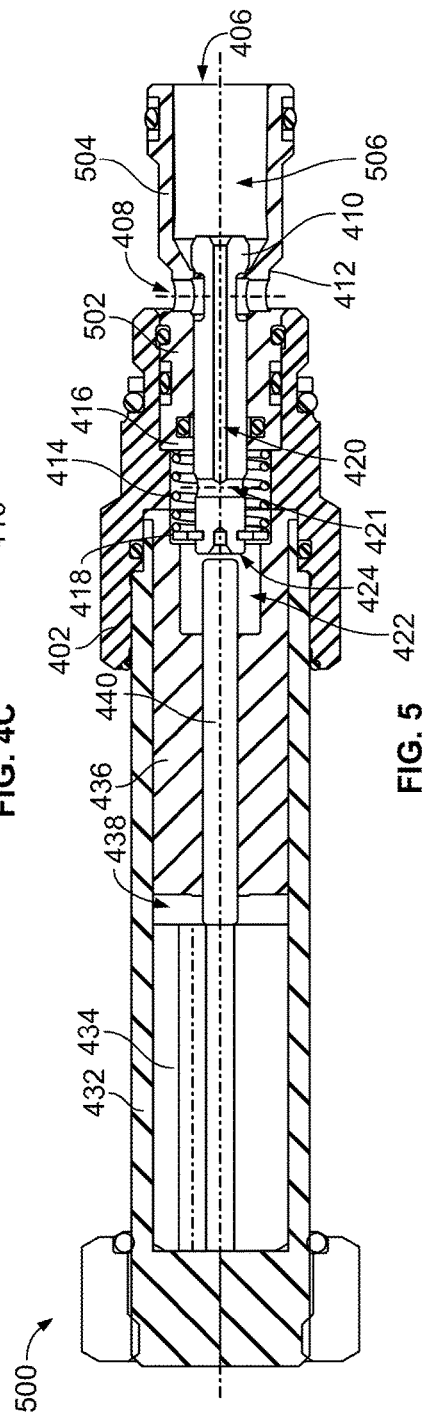
FIG. 5 illustrates a valve with an elongated sleeve, in accordance with an example implementation.

In an example, to further streamline the flow entering at the first port 406, the proximal portion of the sleeve 404 may be elongated. FIG. 5 illustrates a valve 500 with an elongated sleeve 502, in accordance with an example implementation. The valve 500 is similar to the valve 400, and therefore the same reference numbers are used for similar components of the valves 400 and 500. As depicted in FIG. 5, the sleeve 502 has a longer nose 504 compared to the sleeve 404. The nose 504 defines therein a chamber 506.

As such, the fluid received at the inlet port 406 flows through the chamber 506 prior to flowing through the gap formed between the poppet 410 and the sleeve 404. The chamber 506 does not include restrictions, and the fluid may therefore be streamlined prior to flowing through the gap, and the pressure drop across the valve 500 may be reduced compared to the valve 400.

Further, the valve 500 may causes a reduced pressure drop compared to the valve 100. With the valve 100, the sleeve 104 has a short nose portion and the fluid that flows through the gap 202 flows through the chamber 126 prior to flowing through the second port 108. With the valve 500, the fluid flows through the longer nose 504 (i.e., the chamber 506), then across the gap between the poppet 410 and the sleeve 404, and then to the second port 408 without flowing through a long annular chamber similar to the chamber 126. The chamber 126 is more restrictive compared to the chamber 506, and therefore, the overall pressure drop across the valve 500 may be less than the pressure drop across the valve 100.

Although a poppet (e.g., the poppet 410) and a sleeve (e.g., the sleeve 404) are used above to describe an example valve, the geometric features described herein for the poppet and the sleeve could also be implemented for other valve configurations. For instance, a spool valve may have a land that is configured geometrically similar to the poppet 410, and a valve body housing the spool may be configured to have an interior peripheral surface configured similar to the sleeve 404. As such, the description above with respect to the poppet can be applied to any axially or longitudinally movable element, and the description of the sleeve can be applied to any type of valve body housing the axially or longitudinally movable element.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
a housing defining a first longitudinal cavity therein;
a sleeve disposed in the first longitudinal cavity coaxial with the housing, wherein the sleeve defines (i) a first port at an end of the sleeve, (ii) a second port disposed on an exterior peripheral surface of the sleeve, and (iii) a second longitudinal cavity therein, wherein an interior peripheral surface of the sleeve defines a first portion that is tapered at a particular angle and a second portion adjacent to the first portion, wherein the second portion comprises two edges forming a corner that defines a seat; and a poppet mounted within the second longitudinal cavity and configured to move axially therein, wherein:
   when the valve is unactuated, the poppet is seated on the seat of the sleeve to preclude flow through the valve from the first port to the second port, and
   when the valve is actuated, the poppet moves off the seat to allow fluid to flow from the first port, through a flow area formed between: (i) an exterior peripheral surface of the poppet, and (ii) the first and second portions of the interior peripheral surface of the sleeve, to the second port, wherein the flow area comprises a conical channel formed between the interior peripheral surface of the sleeve and the exterior peripheral surface of the poppet, such that the conical channel has a cross sectional area that varies longitudinally along a length of the conical channel.

2. The valve of claim 1, wherein the particular angle is a first angle, and wherein the first portion includes a portion that is tapered at a second angle followed by a respective portion tapered at the first angle.

3. The valve of claim 1, wherein the interior peripheral surface of the sleeve defines a third portion adjacent to the first portion, wherein the third portion is untapered.

4. The valve of claim 3, wherein the particular angle is a first angle, wherein the interior peripheral surface of the sleeve defines a fourth portion adjacent to the third portion, wherein the fourth portion is tapered at a second angle different from the first angle.

5. The valve of claim 1, wherein the particular angle is a first angle, wherein the exterior peripheral surface of the poppet is tapered at a second angle that is different from the first angle.

6. The valve of claim 5, wherein the second angle is smaller than the first angle, such that the conical channel is a converging conical channel.

7. The valve of claim 1, wherein the poppet comprises a front end disposed adjacent the first port of the sleeve, a back end, and an internal channel configured to communicate the fluid received at the front end through the first port to the back end of the poppet, such that pressure of the fluid is applied on both the front end and the back end of the poppet, and the poppet is pressure-balanced.

8. The valve of claim 7, wherein the poppet further includes a plurality of radial channels fluidly coupled to the internal channel and configured to communicate the fluid therefrom to a chamber within the housing in which the back end of the poppet is disposed.

9. The valve of claim 1, wherein the corner is a substantially 90° corner forming the seat.

10. A valve comprising:
a valve body defining (i) a first port, (ii) a second port, and (iii) a longitudinal cavity therein, wherein an interior peripheral surface of the valve body defines a first portion that is tapered at a particular angle and a second portion adjacent to the first portion, wherein the second portion comprises two edges forming a substantially 90° corner that defines a seat; and
a movable element mounted within the longitudinal cavity and configured to move axially therein, wherein:
   when the valve is unactuated, the movable element is seated on the seat of the valve body to preclude flow through the valve from the first port to the second port, and
   when the valve is actuated, the movable element moves off the seat to allow fluid to flow from the first port, through a flow area formed between: (i) an exterior peripheral surface of the movable element, and (ii) the first and second portions of the interior peripheral surface of the valve body, to the second port, wherein the flow area comprises a conical channel formed between the interior peripheral surface of the valve body and the exterior peripheral surface of the movable element, such that the conical channel has a cross sectional area that varies longitudinally along a length of the conical channel.

11. The valve of claim 10, wherein the particular angle is a first angle, and wherein the first portion comprises a portion that is tapered at a second angle followed by a respective portion tapered at the first angle.

12. The valve of claim 10, wherein the interior peripheral surface of the valve body defines a third portion adjacent to the first portion, wherein the third portion is untapered.

13. The valve of claim 12, wherein the particular angle is a first angle, wherein the interior peripheral surface of the valve body defines a fourth portion adjacent to the third portion, wherein the fourth portion is tapered at a second angle different from the first angle.

14. The valve of claim 10, wherein the particular angle is a first angle, wherein the exterior peripheral surface of the movable element is tapered at a second angle that is different from the first angle.

15. A hydraulic system comprising:
a source of pressurized fluid;
a reservoir; and
a valve fluidly coupled to the source of pressurized fluid and the reservoir, wherein the valve comprises:
   a sleeve defining (i) a first port at an end of the sleeve, wherein the first port is fluid coupled to the source of pressurized fluid, (ii) a second port disposed on an exterior peripheral surface of the sleeve, wherein the second port is fluidly coupled to the reservoir, and (iii) a longitudinal cavity therein, wherein an interior peripheral surface of the sleeve defines a first portion that is tapered at a particular angle and a second portion adjacent to the first portion, wherein the second portion comprises two edges forming a substantially 90° corner that defines a seat; and
   a poppet mounted within the longitudinal cavity and configured to move axially therein, wherein:
      when the valve is unactuated, the poppet is seated on the seat of the sleeve to preclude flow through the valve from the source of pressurized fluid to the reservoir, and
      when the valve is actuated, the poppet moves off the seat to allow pressurized fluid to flow from the first port, through a flow area formed between: (i) an exterior peripheral surface of the poppet, and (ii) the first and second portions of the interior peripheral surface of the sleeve, to the second port, wherein the flow area comprises a conical channel formed between the interior peripheral surface of the sleeve and the exterior peripheral surface of the poppet, such that the conical channel has a cross sectional area that varies longitudinally along a length of the conical channel.

16. The hydraulic system of claim 15, wherein the particular angle is a first angle, wherein the exterior peripheral surface of the poppet is tapered at a second angle that is different from the first angle.

17. The hydraulic system of claim 15, wherein the second angle is smaller than the first angle, such that the conical channel is a converging conical channel.

* * * * *